UNITED STATES PATENT OFFICE.

ERNEST MARTIN, OF MARSEILLE, FRANCE.

PROCESS OF MANUFACTURE OF PURE ALUMINA.

1,394,854.   Specification of Letters Patent.   Patented Oct. 25, 1921.

No Drawing.   Application filed August 19, 1919. Serial No. 318,603.

(GRANTED UNDER THE PROVISIONS OF THE ACT OF MARCH 3, 1921, 41 STAT. L., 1313.)

*To all whom it may concern:*

Be it known that I, ERNEST MARTIN, a citizen of the Republic of France, residing at Marseille, France, 3 Rue des Recollettes, have invented new and useful Improvements in Processes of Manufacture of Pure Alumina, (for which I have filed application in France July 10, 1914, Patent No. 475,476,) of which the following is a specification.

The process consists in attacking aluminous earths at a red heat by calcium carbonate and a small proportion of an alkali salt; mixed aluminates are formed, (alkaline earth), which when treated by sodium carbonate give soluble alkali aluminates.

The addition of an alkali salt such as sodium sulfate lowers the melting point of the material and therefore considerably reduces the yields of alumina.

During the heating, the iron oxid and silica contained in the mixture combine with the calcium carbonate or lime; to obtain the best yields it is necessary to add sufficient calcium carbonate to saturate both the alumina and the impurities.

The proportion of calcium carbonate to be incorporated is given by the formula:

Alumina$\times$1.023 silica$\times$1.667. +iron oxid$\times$0.625.

A smaller or larger quantity of calcium carbonate than is given by this formula decreases the yields.

For example one may take: bauxite (containing 60% alumina, 2.5% silica, 24% peroxid of iron), 100 parts; limestone (containing 95-96% of calcium carbonate), 85 parts; sodium sulfate 15 parts.

The mixture should be intimate and it is best to effect it while in wet condition. As for the pulverization, it is sufficient for the aluminous earth and the limestone to pass through a 120-mesh sieve. Heating may be effected in a rotating furnace or in any other furnace system and the temperature should be about 1.300° C. The material which has been heated, obtained under these conditions is pulverulent and is powdered very readily.

During the heating, calcium silicates are formed which are decomposable by the sodium carbonate; to avoid the presence of silica in the extracted alumina, the treatment with sodium carbonate should be effected as follows: Lyes are employed containing 75–100 grams of $Na_2CO_3$ per liter, the necessary quantity by weight being calculated by the ratio:

$$\frac{Al_2O_3}{Na_2O}=1.10.$$

The treatment is effected in two stages:

*a.* The fresh lye serves to attack the incompletely exhausted mud of operation —*b*—.

*b.* The liquid obtained in —*a*— is employed to treat the material which has been heated; it is in the course of this operation that the ratio last above set forth is maintained and the silica disappears from the solutions.

These treatments should be effected with heating toward 80° C. The liquids are separated from the muds by filtrations or by decantations.

The final solution of alkali aluminates, is submitted to carbonatation or to auto-precipitation by the Bayer process; one may advantageously resort at once to both means in combination. The liquors wholly or partially deprived of their alumina serve afresh to attack the material which has been heated, following the cycle which has been indicated.

This process may serve to treat aluminous earths which are very silicious; contrary to what takes place in the direct attack of bauxites by alkalis, the silica does not cause loss of soda.

During the heating, the sulfuric acid of the sulfate of soda is acted on by the lime to form sulfate of lime. In the treatment by the alkaline lye, a part of the sulfate of lime is decomposed by the carbonate of soda for the regeneration of the sulfate of soda. The soda which escapes this regeneration remains in the lye and thus serves to advantageously replace the small quantity of sodium carbonate lost on account of defective washing.

The sodium sulfate which has been reformed and that which has not acted serves for freshly attacking the aluminous materials; the weight of salt thus recovered represents about ⅔ of that which is employed.

The residual muds are sandy and thus easy to wash. Finally the process can be combined in such manner as to avoid any concentration of liquors.

The yield of alumina, using bauxites of

60%, will amount to and may even surpass 50% of the weight of the bauxite.

The combination of the conditions described renders this industrial process very economical for the preparation of pure alumina.

Having now particularly described and ascertained the nature of my said invention and in what manner the same is to be performed, I declare that what I claim is:—

1. The process of manufacturing alumina, which consists in attacking aluminous earths at a high temperature with calcium carbonate and an alkali metal salt, and leaching the mixture with sodium carbonate solutions in two stages.

2. The process of extracting alumina from aluminous earths, which consists in heating to a high temperature a mixture of said earths, calcium carbonate and an alkali metal salt, pulverizing said mixture, and leaching the mixture with an alkaline solution.

3. The process of extracting alumina from aluminous earths, which consists in heating to a temperature of approximately 1300° C. a mixture of 100 parts by weight of aluminous earth, 85 parts of a substance having an approximate calcium carbonate content of 95 per cent. and 15 parts of sodium sulfate, pulverizing said mixture, and leaching the same with a solution of sodium carbonate.

4. The process of extracting alumina from aluminous earths, which consists in heating to a high temperature a mixture of said earths, calcium carbonate and an alkali metal salt, pulverizing said mixture, and leaching the mixture with an alkaline solution at a temperature of approximately 80° C.

In testimony whereof I have signed my name to this specification.

ERNEST MARTIN.

Witnesses:
 JEAN MANKEE,
 LEWIS B. R. SPARKS.